United States Patent
Wang et al.

(10) Patent No.: US 12,153,709 B2
(45) Date of Patent: Nov. 26, 2024

(54) PRIVACY SYSTEM FOR AN ELECTRONIC DEVICE

(71) Applicant: LENOVO (SINGAPORE) PTE. LTD, New Tech Park (SG)

(72) Inventors: Mengnan Wang, Chapel Hill, NC (US); Daryl C. Cromer, Raleigh, NC (US); Howard Locker, Cary, NC (US); John W. Nicholson, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 287 days.

(21) Appl. No.: 17/653,338

(22) Filed: Mar. 3, 2022

(65) Prior Publication Data

US 2023/0281335 A1 Sep. 7, 2023

(51) Int. Cl.
*G06F 21/62* (2013.01)
*G10K 11/175* (2006.01)

(52) U.S. Cl.
CPC ........ *G06F 21/6245* (2013.01); *G10K 11/175* (2013.01)

(58) Field of Classification Search
CPC ........ H04W 12/02; H04W 4/38; H04L 51/10; G10K 11/175; G10K 11/1752; G06V 40/53; G06F 21/6245; G06F 21/32
See application file for complete search history.

(56) References Cited

U.S. PATENT DOCUMENTS

| | | | | |
|---|---|---|---|---|
| 10,580,272 B1* | 3/2020 | Edwards | ............. | G06V 40/161 |
| 10,896,664 B1* | 1/2021 | Buesser | ............. | G10L 15/22 |
| 11,128,636 B1* | 9/2021 | Jorasch | ............. | H04W 12/33 |
| 11,321,487 B2* | 5/2022 | Kwatra | ............. | H04W 12/63 |
| 2006/0136743 A1* | 6/2006 | Polcha | ............. | G07C 9/37 713/186 |
| 2011/0210931 A1* | 9/2011 | Shai | ............. | G06F 3/03547 345/173 |
| 2015/0163408 A1* | 6/2015 | Laroia | ............. | H04N 5/77 348/208.1 |
| 2018/0061010 A1* | 3/2018 | Akselrod | ............. | H04N 21/4627 |
| 2019/0272361 A1* | 9/2019 | Kursun | ............. | H04L 67/535 |
| 2019/0333493 A1* | 10/2019 | Zenk | ............. | G10L 15/22 |
| 2020/0251122 A1* | 8/2020 | Huang | ............. | G06F 3/165 |
| 2020/0267472 A1* | 8/2020 | McElveen | ............. | H04R 3/005 |
| 2020/0382868 A1* | 12/2020 | Felton | ............. | G06F 3/0482 |
| 2021/0034724 A1* | 2/2021 | Fong | ............. | G06V 40/25 |
| 2021/0182111 A1* | 6/2021 | Jakobsson | ............. | G06F 9/5055 |
| 2022/0076688 A1* | 3/2022 | Zhang | ............. | H04L 51/10 |
| 2022/0164470 A1* | 5/2022 | Obaidi | ............. | G06N 20/00 |
| 2022/0210365 A1* | 6/2022 | Agrawal | ............. | G06F 21/6245 |

(Continued)

FOREIGN PATENT DOCUMENTS

WO WO-2016118626 A1 * 7/2016 ............. B64U 10/13

*Primary Examiner* — Lizbeth Torres-Diaz
(74) *Attorney, Agent, or Firm* — Dean D. Small; The Small Patent Law Group, LLC

(57) ABSTRACT

An electronic device is provided that includes an input device configured to receive sound, a processor, and a memory storing program instructions accessible by the processor. Responsive to execution of the program instructions, the processor is configured to identify a third party application that accesses the electronic device, and vary sound characteristics obtained by the input device based on the third party application identified to prevent a biometric algorithm from obtaining user information.

18 Claims, 3 Drawing Sheets

(56) References Cited

U.S. PATENT DOCUMENTS

2022/0414365 A1* 12/2022 Nicholson ............ H04N 23/815
2023/0171338 A1* 6/2023 Erez .................. H04M 1/72457
                                                              455/575.8

* cited by examiner

PRIVACY SYSTEM FOR AN ELECTRONIC DEVICE

FIELD

The present disclosure relates generally to an auditory privacy system for an electronic device.

BACKGROUND OF THE INVENTION

Common smartphones, tablets, laptop computers, and other mobile electronic devices include sound systems that are utilized by a user. The sound systems may include one or more microphones for detecting sounds in an environment, one or more speakers for providing sounds, or the like. As technology has advanced, voice recognition and sound recognition software and devices have been developed to allow additional functionality for the electronic devices. Such additional functionality includes voice to text software, conversion of voice instructions, commands, requests, or the like.

In addition, software and hardware has been developed to obtain biometric information related to the user. This biometric information may be utilized for preferred settings, providing targeted advertising, or the like. Problematically, often a user has no desire for a third party to obtain their biometric information. Previously, when a third party or third party application desired to obtain biometric information related to a user of an electronic device the user was able to fill out a form providing the information. Because the user provided the information, the user decided what information to provide, e.g. email, name, address, birthday, etc. In such an instance, the user had clear knowledge and consent of the information that was collected, and could even provide faulty information for questions they did not decide to answer.

Today, such control and privacy does not exist. Instead, artificial intelligence algorithms, machine learning, computer vision, or the like are provided in applications and software that gathers biometric information without the knowledge or consent of the user. In other instances, the user consents as a result of agreeing to terms, conditions, etc., such as in an end user license agreement that is not closely read or understood. As a result, often biometric information is obtained by these third parties without the knowledge of the user. As an example, from sounds received by a microphone a third party may be able to determine an approximate age of the user, the user gender, potential location based on accents and word choice, race, health conditions, or the like. In all, only the creator of the third party application or service knows what information is captured and processed.

SUMMARY

In accordance with embodiments herein, an electronic device is provided that includes an input device configured to receive sound, a processor, and a memory storing program instructions accessible by the processor. Responsive to execution of the program instructions, the processor is configured to identify a third party application that accesses the electronic device, and vary sound characteristics obtained by the input device based on the third party application identified to prevent a biometric algorithm from obtaining user information.

Optionally, the processor is configured to vary the sound characteristic before the input device receives the sound characteristic. In one aspect, the processor is configured to vary the sound characteristic after the input device receives the sound characteristic. In another aspect, the sound characteristic is varied by changing the sound characteristic after the input device receives the sound characteristic.

Optionally, the electronic device also includes a sound generating device positioned adjacent the input device. The sound generating device can be configured to vary the sound characteristic obtained by the input device by generating a sound filtering noise received by the input device. In another aspect, the sound generating device is a speaker. In one example, the input device is a microphone. In another example, the processor is configured to prompt a user for user data to provide settings. In one embodiment, the processor is also configured to determine a launching of the third party application on the electronic device, and identify the third party application in response to the launching of the third party application.

In accordance with embodiments herein, a method may be provided under control of one or more processors including program instructions to obtain user data related to providing biometric information to a third party application, and determine that the third party application is accessing an electronic device. The method may also include identifying the third party application in response to determining that the third party application is accessing the electronic device, and varying a sound characteristic provided to the third party application identified to prevent a biometric algorithm from obtaining user information. The method may also include obtaining a determined filtering sound based on identifying the third party application, obtaining the sound characteristic from a microphone of the electronic device, and generating the determined filtering sound adjacent the microphone to vary the sound characteristic.

Optionally, to determine filtering sound is based on a biometric algorithm of the third party application. In one aspect the method also includes varying the sound characteristic by changing the sound characteristic after an input device receives the sound characteristic. In another aspect, the method also includes determining a launching of the third party application on the electronic device, and identifying the third party application in response to the launching of the third party application.

In accordance with embodiments herein, a sound generating device is provided that includes a speaker configured to be coupled to an electronic device, a processor, and a memory storing program instructions accessible by the processor. Responsive to execution of the program instructions, the processor is configured to identify a third party application that accesses the electronic device, and vary a sound characteristic before the sound characteristic is obtained by an input device of the electronic device based on the third party application identified to prevent a biometric algorithm from obtaining user information.

Optionally, the sound generating device includes an attachment mechanism configured to secure the sound generating device adjacent the input device of the electronic device. In one aspect, the processor is further configured to obtain a determined filtering noise based on identifying the third party application, and generate the determined filtering noise to vary the sound characteristic before the sound characteristic is obtained by the input device. In one example, the processor is also configured to determine a launching of the third party application on the electronic device, and identify the third party application in response to the launching of the third party application.

DETAILED DESCRIPTION

Figure 1:
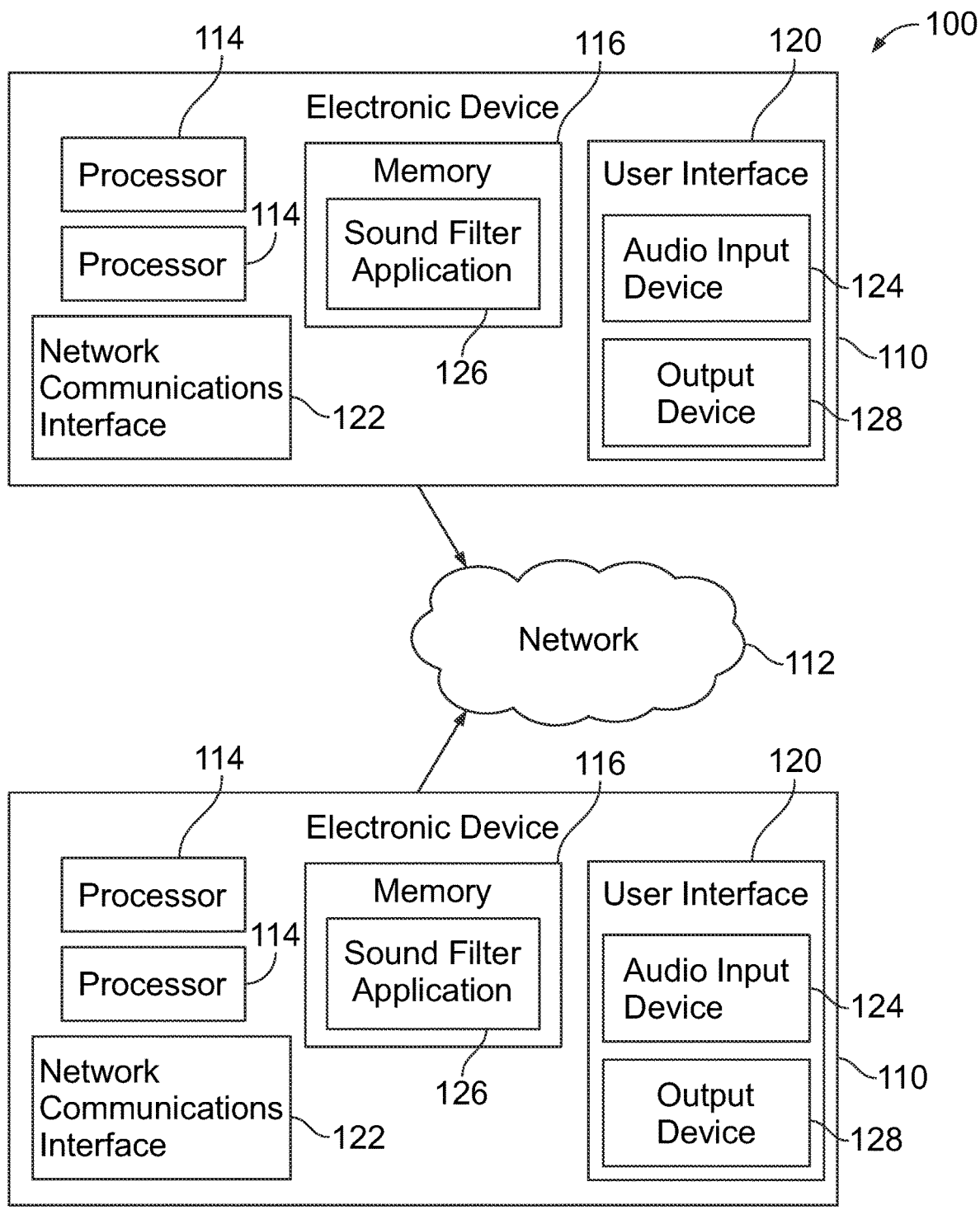
FIG. 1 illustrates a simplified block diagram of an electronic device in accordance with an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Provided are systems and methods for providing security for the user of an electronic device. The systems prevent biometric algorithms of third party applications from making accurate determinations based on sounds and corresponding sound characteristics obtained from an input device such as a microphone of the electronic device. To do so, the systems and method vary sound characteristics made by a user so that the sounds and corresponding sound characteristics obtained by the third party applications and used in a biometric algorithm are different than those made by the user. In one example, a sound generating device is provided that generates sound filtering noise that changes a characteristic of sounds made by a user. The sound filtering noise may be generated in a range that is not audible to humans to prevent annoyance by a user. In addition, if the third party application that is attempting to obtain the user information has a known biometric algorithm, the sound filtering noise can be configured to filter the noise based on that biometric algorithm. Alternatively, in another embodiment, instead of a sound generating device, the sound characteristics themselves may be varied after they are received by an input device via altering a signal, or otherwise. In each instance, by varying the sound characteristic(s) before a third party application receives the sound characteristic, the biometric algorithm of the third party application is unable to make accurate determination regarding user information.

The term "third party application" shall mean any program, software, source, webpage, website, service, or the like that may be provided on a server, operating system, driver, etc. that may be used or gain access to an electronic device. By gaining access to the electronic device, the third party application may obtain user information including user information stored in a memory, obtained from sensors, input devices, cameras, microphones, keystrokes, or the like. Example third party applications may include voice to text applications, conferencing applications, delivery applications, marketing applications, camera applications, web-based applications, exercise applications, financial applications, food or diet applications, transportation applications, or the like. Third party applications include all application that capture sounds, voices, utilizes a microphone, or the like. For the purposes of clarification, the use of the term "third party" does not connote certain ownership rights, and instead connotes that a source, program, software, etc. is not at or part of an electronic device.

The term "sound characteristic" and "sound characteristics" shall mean any and all features, qualities, or the like of sound or related to sound. Sound characteristics may include characteristics of a sound wave such as amplitude, frequency, period, or the like. Sound characteristics may also include measurements such as decibels, Hz, etc. Sound characteristics may be generated by a user, voice, person in an environment, machines, device, speaker, etc. Sound characteristics may be received directly from a user, input into an electronic device, obtained or received by an input device, receiver, microphone, etc. In addition, a single sound may include plural sound characteristics. To this end, the change of one characteristic of a single sound from a single source can change the sound.

The term "biometric algorithm" shall mean any algorithm, program, mathematical equation, mathematical function, mathematical model, machine learning algorithm, artificial intelligence algorithm, or the like utilized to determine user information related to a user, and in on example biology related information from a person. Biology related information can include age, sex, weight, heart rate, health conditions, breathing rate, accent, race, ethnicity, or the like.

The term "user information" shall mean facts provided by or learned about a user of an electronic device. User information may include age, sex, weight, heart rate, breathing rate, accent, race, ethnicity, address, social security number, information input into an application, or the like.

The terms "processor," "a processor", "one or more processors" and "the processor" shall mean one or more processors. The one or more processors may be implemented by one, or by a combination of more than electronic device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

The term "sound filtering noise" shall mean any sound, whether audible or not audible to a human, that can change at least one sound characteristic of a sound projected by a different source. The sound filtering noise may be less than 20 Hz, between 5 Hz-20 Hz, less than 5 Hz, between 20 Hz and 20 kHz, or more than 20 kHz.

FIG. 1 illustrates a system 100 that includes one or more electronic devices 110 that communicate with one another over a network 112. Optionally, the electronic devices 110 may communicate through a wholly or partially wired subsystem. The network 112 may represent the World Wide Web, a local area network, a wide area network (WAN) and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like. In addition, the electronic devices 110 may represent various types of devices configured to record audio and/or voice signatures, detect gestures and movements and the like.

At least one of the electronic devices 110 may be configured to implement sound filtering in accordance with embodiments herein. The electronic device 110 that is configured to implement sound filtering may include one or more processors 114, memory 116, a user interface 120, a network communications interface 122, and various other mechanical components, electrical circuits, hardware and software to support operation of the client device 110. It is recognized that not all electronic devices 110 include a display, user interface, and the like. For example, music playing device may only include a microphone and speaker without a display.

The memory 116 can encompass one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, user information, and other information. Each operating system includes executable code that can be stored in the memory that controls basic functions of the electronic device, such as interaction among the various components, communication with external devices via a wireless transceivers and/or component interface, and storage and retrieval of applications and data to and from the memory 116. Each application includes executable code that utilizes an operating system to provide more specific functionality for the electronic device.

The user interface 120 may include a variety of visual, audio, and/or mechanical devices. For example, the user interface 120 can include a visual input device such as an optical sensor or camera, and a mechanical input device such as a keyboard, keypad, selection hard and/or soft buttons, switch, touchpad, touch screen, icons on a touch screen, a touch sensitive areas on a touch sensitive screen and/or any combination thereof. As further examples, the user interface 120 may include a touch sensitive screen, a non-touch sensitive screen, a text-only display, a smart phone display, and/or any combination thereof. The user interface 120 permits the user to select one or more of a switch, button or icon in connection with various operations of the device 110. Similarly, the user interface 120 can include a visual output device such as a liquid crystal display screen, one or more light emitting diode indicators, or the like. The display may be touch sensitive to various types of touch and gestures.

The user interface 120 may also include an audio input device 124 such as a microphone, recorder, or the like that receives sounds waves from the environment. The audio input device 124 may include voice recognition functionality, voice to text functionality or the like. In one example, the memory 116 may include a sound filter application 126 configured to prevent third party applications from using information obtained by the audio input device to make determinations about the user.

In one example, the sound filter application 126 may process the users voice to change the overall tone, pitch, decibel level, sound wave, etc. By altering the voice of the user, a third party application is unable to determine information related to the user, including the approximate age, gender, or the like. In one example, the sound filter application 126 may include a prompt for a user to provide user data of when the sound filter application is to be utilized. In this manner, the voice alteration does not occur when determined applications such as calling applications, voice to text applications, or the like are being utilized. Alternatively, if an individual does not mind third parties having voice information related to them, the user may keep the sound filter application 126 off. To this end, the sound filter application 126 in one example may be independent of an operating system and/or application and instead may be implemented at a device driver where a user can have control over the strength and preference settings.

The user interface may also include an audio output device 128 such as a speaker, alarm and/or buzzer, headphone jack, etc. In one embodiment, the audio output device 128 may be included as part of the hardware of the electronic device, within the housing of an electronic device, coupled within and electronic device, or the like. Alternatively, the output device 128 may be a speaker, microphone, sound producing device, etc. that is separate from the electronic device and coupled to the electronic device. The standalone output device 128 may be mechanically coupled to the electronic device by being on a clip, having adhesive, snap fit, or the like, electrically coupled through an electrical cord, USB cable, phone cable, ethernet cable, or the like, logically or virtually coupled through a wireless communication channel, Wi-Fi, Bluetooth™, cellular network, or the like.

In one example, the output device may be a speaker located adjacent a microphone of the electronic device where the speaker creates sound patterns before being captured by the microphone to guarantee the presence of the sound in the microphone data stream. In an example, sound patterns outside of the hearing range of human hearing, which can only be picked up by recording devices may be utilized. The injected sound filtering noise, such as random noise, may be designed to specifically interfere with biometric algorithms, including biometric algorithms that determine age or gender.

In another example, the output device 128 may be placed on the same bevel adjacent the input device 124 to facilitate the input device receiving the interfering sound filtering noise, even when the sound filtering noise is produced at a level that is not able to be heard by a human. Optionally, the output device may produce sound filtering noise for anti-biometric algorithm information collection that can be actuated by the user while using other recording devices to prevent those devices from algorithmically obtaining the user's biometric data using a biometric algorithm. The output device 128 may also be of a transducer design that is not traditionally used for loudspeakers designed for human consumption. By being placed near the input device, audio input device, microphone(s), etc., the volume of the sound filtering noise produced need not be large so that it would affect other usage.

Additionally, in one example, a stand-alone output device 128 is provided instead of having the output device 128 be part of the electronic device. When operating, the output device 128 device can output the sound filtering noise from a speaker and collect user's voice from the microphone. Because they are in the same device, one or more processors of the electronic device may analyze the added noise level and determine if the privacy protection is effective such that biometric information cannot be extracted from it.

The output device 128 may be configured to provide the sound filtering noise, such as random noise, at different intervals. In one example, the sound filtering noise provided is not audible to a human, yet able to provide interference with voice recognition, or sound interpretation circuitry, devices, software, applications, or the like. In particular, the details required to be recognized by human ears is different from the ones required for collecting biometric data, and when biometric algorithms of third party applications are known, certain interference in the recording data can be added without disturbing a user so that biometric algorithms are not able to determine user information.

In one example, the sound filtering noise may be at determined level or interval such as a determined decibel level, frequency level, duration level, or the like. For example, the sound filtering noise may occur every five seconds. In another example, the sound filtering noise may be at different decibel levels and/or frequency levels every five seconds. Alternatively, the sound filtering noise may be at the same decibel level and/or frequency level and at different intervals, including intervals at five seconds, three seconds, five seconds, seven seconds. The different intervals may include a pattern that repeats, whereas in other examples the intervals may not have a pattern, such as one provided by a random number generating device, circuitry, or program.

In one example, the electronic device may include a database, detection device, or the like that includes biometric algorithms utilized by third parties to gather information related to a user through the input device. For example, known applications may be provided that are known to gather information about a user using a determined biometric algorithm. If the known application is downloaded, uploaded, installed, or the like on the electronic device, from information in a database the biometric algorithm utilized by third parties, or an associated filtering noise generation associated with the application may be provided. In one example, a lookup table may be provided. In particular, most applications, programs, etc. utilize techniques using spectral features that represent speaker characteristics that may be impeded by determined noise characteristics. To this end, some applications, programs, etc. will also include speaker recognition algorithms that include a step, or filter for cancelling noise from the environment before such spectral feature extraction is provided. In sum, the application, program, or like continuously monitors for background noise that is constant, such as an air conditioner, fan, or the like. The algorithm then cancels out this noise to provide more accurate information related to sounds, words, etc. made by a user. So, to counteract such biometric algorithms, the output device 128 provides the sound filtering noise that cannot be cancelled out by the biometric algorithms that include noise cancellation to ensure the filtering noise interferes the any application, program, etc. that is attempting to obtain the user information from the input device 124. In each instance, the output device 128 varies or alters a sound characteristic that is received by the input device 124 before the sound characteristic is received.

Alternatively, the sound characteristic may be varied, altered, changed, etc. after the sound characteristic is received by the input device 124. In one example, the sound filter application 126 may vary one or more sound characteristics received by the input device 124. The sound characteristics may include frequency level, amplitude, decibels, period changes, or the like. In one example, the change made is in the signal obtained from the input device 124. The variance, alteration, change, etc. occurs before the sound characteristic is passed along to any third party application. In this manner, because of the changes, the third party application is prevented from obtaining biometric user information from the sound characteristics obtained by the third party application.

Figure 2:
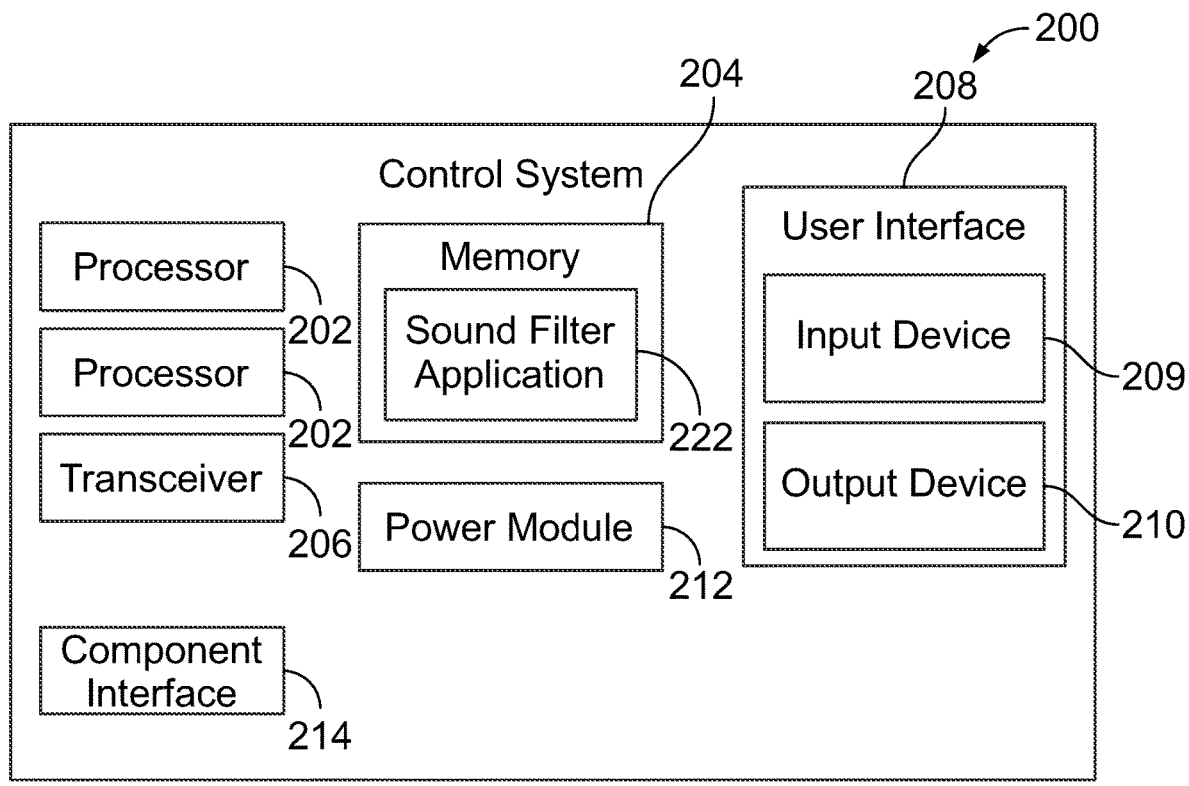
FIG. 2 illustrates a control system for an electronic device, in accordance with embodiments herein.

Turning now to FIG. 2, FIG. 2 illustrates a control system 200 of an electronic device. In one example the electronic device is the electronic device of FIG. 1. The control system 200 includes components such as one or more processors 202 (e.g., a microprocessor, microcomputer, application-specific integrated circuit, etc.), one or more local storage medium (also referred to as a memory portion) 204, one or more wireless transceivers 206, a user interface 208 which includes one or more input devices 209 and one or more output devices 210, a power module 212, and a component interface 214. All of these components can be operatively coupled to one another, and can be in communication with one another, by way of one or more internal communication links, such as an internal bus.

The local storage medium 204 can encompass one or more memory devices of any of a variety of forms (e.g., read only memory, random access memory, static random access memory, dynamic random access memory, etc.) and can be used by the processor 202 to store and retrieve data. The data that is stored by the local storage medium 204 can include, but not be limited to, operating systems, applications, obtained user characteristics, obtained sound characteristics, obtained electronic device characteristics, etc. Each operating system includes executable code that controls basic functions of the device, such as interaction among the various components, communication with external devices via the wireless transceivers 206 and/or the component interface 214, and storage and retrieval of applications and context data to and from the local storage medium 206.

The input and output devices 209, 210 may each include a variety of visual, audio, and/or mechanical devices. For example, the input devices 209 can include an audio input device such as a microphone, a mechanical input device such as a keyboard, keypad, selection hard and/or soft buttons, switch, touchpad, touch screen, icons on a touch screen, a touch sensitive areas on a touch sensitive screen and/or any combination thereof. The output devices 210 can include an audio output device such as a speaker, a visual output device such as a liquid crystal display screen, a mechanical output device such as a vibrating mechanism, etc. The display may include a display stack and be touch sensitive to various types of touch and gestures. As further examples, the output device(s) 210 may include a touch sensitive screen, a non-touch sensitive screen, a text-only display, a smart phone display, and/or any combination thereof.

The local storage medium 206 in one embodiment stores various content including, but not limited to a sound filter application 222. The sound filter application includes executable code that utilizes an operating system, or device drive to monitor and control sounds provided to third party applications.

The sound filter application 222 may include settings, and may provide a prompt for input data from a user. The input data may include having the sound filter application 222 operating at all times, operating based on applications utilizing the electronic device, not operating, or the like. In one example, the user provides a list of all third party applications from which user desires to allow an input device, such as a microphone, to provide information to an application. Thus, a voice to text application, an application that provides answers to auditory questions, or other such applications may be listed or provided by a user so that no alterations or variance of the sounds received by the microphone occur. In one example, each time a new application is downloaded, uploaded, accesses an input device such as a microphone, or the like, for the first time, a prompt may be provided to give the user the option to include the application on a list to permit or prevent collection of auditory data from user. In this manner, even if a user agrees to terms of an application without realizing their auditory data is being collected, by utilizing user data provided by the user, the sound filter application prevents such collection without the knowledge of the user.

In one example, the user may input user data such as user profile information related to the user. In this manner, when the user logs into the electronic device as a result of a password, passcode, pass pattern, finger print, facial recognition, eye recognition, or the like, the setting from the profile is automatically provided. For one individual who desires targeted advertisements, or is not bothered by being identified may have the setting where no variance to sounds, or added sounds are provided. For another individual who does not desire targeted advertisements, does not like being identified, etc., the setting may be on such that as soon as the access to the electronic device is gained by a third party, sound filtering is provided. In another example, an individual may manually change the setting so that the sound filtering is either turned on or off based on the selection. In one example, when the sound filtering application 222 is initially installed, the setting is automatically in an "on" setting. Alternatively, the setting is automatically in an "off" setting and the application prompts the user regarding whether sound filtering is desired. In another example, a prompt may appear each time an electronic device is unlocked. To this end, the processor can be configured to filter user sounds by turning "on" and turning "off" the sound filter application 222 whereby the sound filter application 222 prevents a biometric algorithm from extracting user information based on sounds.

The sound filter application 222 when actuated may include instructions to determine when a third party application is attempting to obtain user information via an input device that obtains one or more sound characteristics. To this end, the sound filter application may include instructions to identify third party applications, and when third party applications attempt to obtain such sound characteristic(s). The third party application may be identified when the user accesses the third party application, the third party application is uploaded, downloaded, installed, or the like. In another example, the launching of a third party application results in the determination and identification of the third party application. Thus, the identification of the third party application can be in response to the launching of the third party application. Once the third party application is identified, the sound filter application 222 may include instructions to determine if the user has identified the third party application as not having permission to obtain sound characteristic. In one example, a list of third party applications that have permission to obtain sound characteristics is provided by the user, and if the third party application is not on that list, sound filtering occurs. In another example, the user, manufacturer, etc. provides a list of third party applications that have permission to obtain sound characteristics and a list of third party applications that do not have permission to obtain sound characteristics. In such an example, if the third party application is not identified as on either list, the sound filter application 222 can provide instructions to provide a prompt to the user that a new third party application has been identified, and request the user provide user data such as to select the list for the new third party application. In other examples, a default may be provided that sound filtering shall occur when a third party application is not on the list of permitted third party applications until the user places the third party on the permitted list, whether through a prompt or otherwise.

The sound filter application 222 when actuated to filter sound, can include instructions for filtering sound in any manner. In one example, any and all sound received by an input device may be automatically varied, altered, or the like before being received by a third party application. This includes by changing the received pitch, decibel level, sound wave, accent, or the like. In another example a speaker, that may be part of the electronic device, or a standalone device, may be instructed to continuously provide sound filtering noise, such as random noise, to the input device. The sound filtering noise in one example is not audible by a human (e.g. between 20 Hz and 20 KHz). The sound filtering noise may include a pattern, not have a pattern, vary intensity, frequency, phase, amplitude, or the like to provide the sound filtering noise. In one example, the sound filter application 222 can include instructions to provide the sound filtering noise based on the identified third party application. In one such example, a lookup table is provided that associates the sound filtering noise with a particular third party application such that sound filtering noise provided is based on the identified third party application. In this manner, when a third party application has a known biometric algorithm for obtaining biometric user information utilizing sound characteristics received from an input device, a sound filtering noise, including the timing of noise, volume of noise, frequency of noise, etc. may be provided to prevent the known algorithm from obtaining sound based information. As a result, the effectiveness of the sound filtering is improved.

Figure 3:
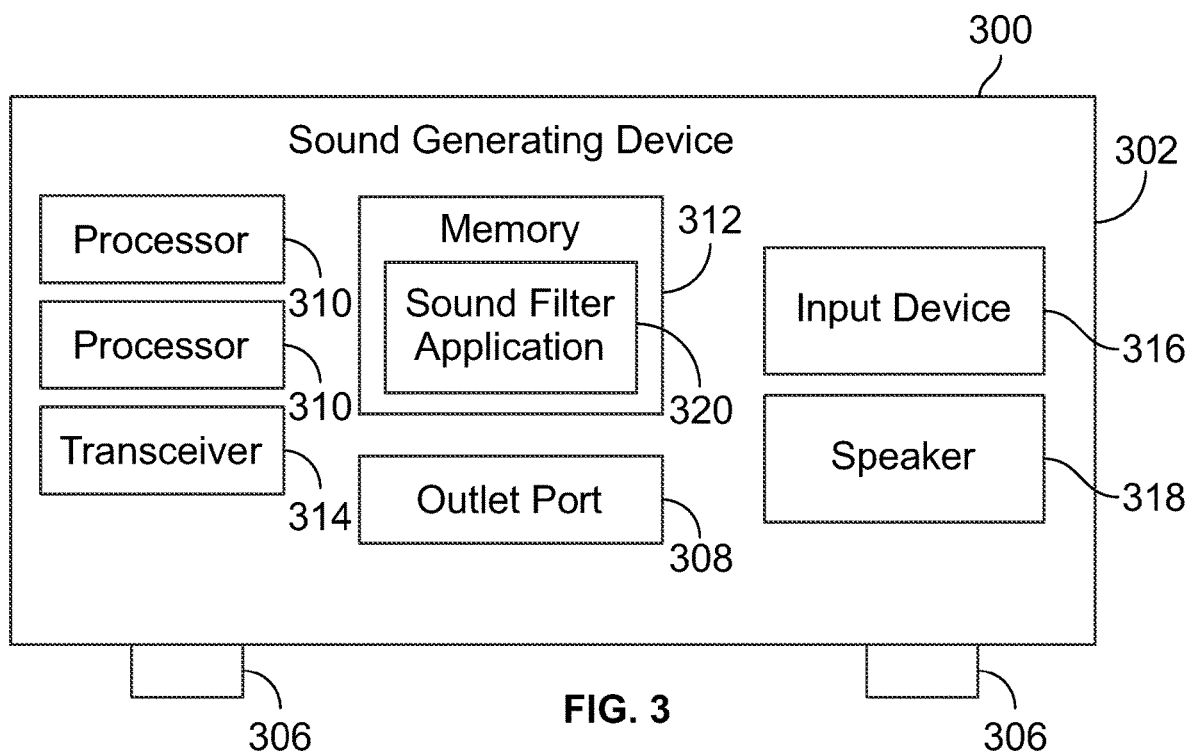
FIG. 3 illustrates a sound generating device in accordance with embodiments herein.

FIG. 3 illustrates a stand alone sound generating device 300. In one example, the sound generating device 300 may be a speaker, a smart speaker, or the like. In one example the sound generating device is an output device, audio output device, or the like described in relation to FIGS. 1 and 2. The sound generating device 300 may include a housing 302 that in one example is of size and shape that is smaller than an electronic device utilizing the sound generating device 300. In one example the housing may include an attachment mechanism 306 to attach the sound generating device 300 to an electronic device. In example embodiments the attachment mechanism may be a clip, adhesive, clamp, Velcro™, suction cup, or the like that allows mechanical coupling to the housing 302. In one example, the attachment mechanism 306 is an adhesive, and the housing 302 is of size and shape that if the housing is placed on a laptop screen adjacent to a microphone such that the housing does not block the screen and may be enclosed by the laptop when the laptop is in a closed position.

The housing 302 may also include an outlet port 308 configured to permit an electrical connection with the electronic device via a communication cable such as a phone cord, USB cable, ethernet cable, or the like. In one example, the communication cable is an attachment mechanism 306 that secures the housing to an electronic device.

The housing may also contain one or more processors 310, memory 312, transceiver 314, input device 316 and speaker 318. The memory 312 may include a sound filter application 320 that includes instructions to communicate with one or more processors of an electronic device, including a transceiver of the electronic device such that the sound filter application 320 and one or more processors of the electronic device are in communication with one another even when the housing 302 does not physically attach to the electronic device. Alternatively, a communication path may be provided by a communication cable that couples the housing 302 to the electronic device.

The sound filter application 320 includes instructions to communicate with the one or more processors of the electronic device to receive information from a user regarding sound privacy desired by the user. The sound privacy includes all examples previously provided including filtering all sounds, using lists of permitted third party applications and not permitted third party applications, providing prompts for user data, and the like. To this end, in response to identifying a third party application in use that the user does not desire to have biometric user information, the sound filter application 320 provides instructions to actuate the speaker 318 to provide filtering sounds. The filtering sounds may be any as previously described. In addition, the sound filter application 320 may also identify the third party application, including through communication with the electronic device and base the filtering sounds on the identification of the third party application. In one example, the memory 312 may include a lookup table associated with identified third party applications. In this manner, the stand alone sound generating device 300 may be coupled to one or more existing electronic devices to provide additional privacy for the user.

Figure 4:
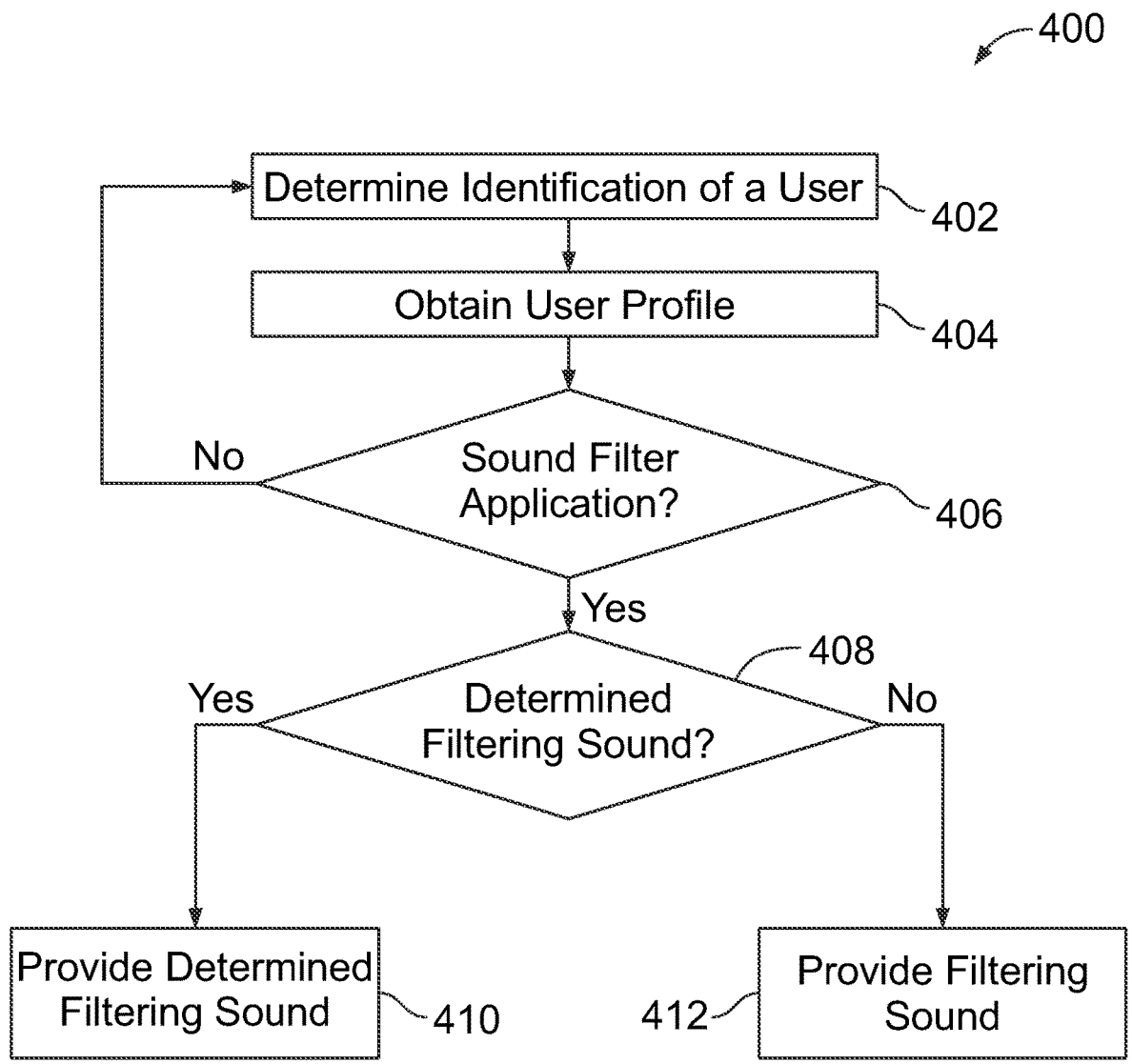
FIG. 4 illustrates a block flow diagram illustrating a method for preventing the obtaining of user information from sound characteristics, in accordance with embodiments herein.

FIG. 4 illustrates a flow block diagram of a method 400 method for preventing the obtaining of user information from sound characteristics by a third party application. In one example, the electronic device, control system, or sound generating device illustrated in FIGS. 1-3 are utilized to implement the method.

At 402, one or more processors determine an identification of a user of an electronic device. The determination may be made based on a password, passcode, login, fingerprint scan, facial scan, or the like. In some embodiments, the user of an electronic device may vary. For example, a laptop may be utilized by plural members of a family. For example, when the laptop is initially operated, a password, passcode, login, fingerprint scan, facial scan, or the like must be provided to allow access to the laptop. Based on this information, the user of the laptop may be identified accordingly.

At 404, the one or more processors obtain a user profile and corresponding setting for a sound filter application based on the user identified as operating the electronic device. The user profile can include information related to a particular user, including security preferences. In one example, the sound filter application application may have default settings that may be edited by a user. In another example, the sound filter application may prompt a user to provide user data such as settings. In yet another example, the sound filter application can detect when a third party application is attempting to utilize a microphone, sound sensor, or the like to obtain information related to the user, and in response to detecting the attempt, a prompt may be provided that a third party application is attempting to obtain user information and a request may be provided to increase security, or alter security settings.

In an example, the setting can include a security setting such that at all times the sound filter application actuates a speaker, standalone speaker, voice altering software, or the like to interfere with the sounds recorded and received by a third party application to prevent a third party application from receiving biometric user information. In another example, the user may provide a list of applications or programs that may obtain biometric user information, or a list of applications or programs where the sound filter application does not run during use. In one example, when a meeting application such as Teams, Zoom, GoToMeeting, WebEx, or the like is operating the sound filter application may be operating to not actuate and cause the voice of the user to not be understood during such a meeting. Alternatively, certain users may desire certain applications such as Amazon, or another shopping website to provide purchasing suggestions, so when such third party applications desire user information, the sound filter application can again allow such information to be collected. To this end, the user may provide a customized list of webpages, websites, programs, applications, or the like that may utilize the microphone, sound sensor, etc. to obtain user information. Then for any webpage, website, program, application, etc. not on that list, the sound filter application operates to vary, change, obscure, etc. sounds being obtained by third party applications to prevent user information from being discerned by the third party application.

At 406, the one or more processors determine if the user desires to utilize the sound filter application to prevent websites, programs, applications, etc. from obtaining user information using the microphone, sound sensors, etc. Based on the user settings, if the user is ok with third party applications obtaining information, no action is taken by the sound filter application.

If a determination is made that the user desires to utilize the sound filter application, then at 408 the one or more processors continuously alter sounds received by the electronic device. In one example, a speaker may be provided that generates a sound that results in interference by producing filtering noise. In one example, the filtering noise is less than 20 Hz such that a human cannot hear the noise, but interference with sound waves occurs. The filtering noise may include a pattern, be random, vary any sound characteristic, or the like. In another example, the sound data or information obtained by a microphone, sound sensor, etc. is manipulated, varied, changed, altered, etc. before communicated for third party applications.

At 410, one or more processors determine whether the identified third party includes a determined filtering sound. For example, a lookup table may be utilized in association with the identified third party such that an associated filtering sound may be provided. Because third party algorithms can be identified, such algorithms, and determinations related to the most effective sounds to combat such algorithms may be provided, and periodically updated. Such filtering sound may be provided by a speaker, sound producing device, or the like, or by voice altering mechanisms. By using this information, the sound filtering can be enhanced. In one example, voice altering mechanisms can include voice modulation, changing pitch, increasing frequency, decreasing frequency, substituting with a different voice or sound, or the like.

If at 410 a determination is made that a third party includes a determined filtering sound, then at 412, the one or more processors provide that determined filtering sound to prevent biometric user information from being obtained by a third party application using a biometric algorithm. Alternatively, if at 410 a determination is made that the third party does not have a determined filtering sound, then at 414, the one or more processors provide a filtering sound not based on the third party application. In this manner, regardless of whether the third party application is identified as associated with a determined filtering sound, filtering sound is still provided to prevent a third party application form obtaining biometric user information.

CONCLUSION

Before concluding, it is to be understood that although e.g. a software application for undertaking embodiments herein may be vended with a device such as the system 100, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A electronic device, comprising:
   an input device configured to receive sound,
   a processor; and a memory storing program instructions accessible by the processor, wherein, responsive to execution of the program instructions, the processor configured to:
   identify a third party application accessing the electronic device;
   in response to the identifying, vary sound characteristics based on the third party application identified, wherein the sound characteristics are obtained by the input device; and
   prevent a biometric algorithm of the third party application from obtaining user information by providing the varied sound characteristics to the biometric algorithm.

2. The electronic device of claim 1, wherein the processor is configured to vary the sound characteristic before the input device receives the sound characteristic.

3. The electronic device of claim 1, wherein the processor is configured to vary the sound characteristic after the input device receives the sound characteristic.

4. The electronic device of claim 3, wherein the sound characteristic is varied by modulating the sound characteristic after the input device receives the sound characteristic.

5. The electronic device of claim 1, further comprising a sound generating device positioned adjacent the input device, the sound generating device configured to vary the sound characteristic obtained by the input device.

6. The electronic device of claim 5, wherein the sound generating device is a speaker.

7. The electronic device of claim 1, wherein the input device is a microphone.

8. The electronic device of claim 1, wherein the processor is configured to prompt a user for user data to provide settings.

9. The electronic device of claim 1, wherein the processor is further configured to determine a launching of the third party application on the electronic device; and identify the third party application in response to the launching of the third party application.

10. A method, comprising:
    under control of one or more processors including program instructions to:
    obtain user data related to providing biometric information to a third party application;
    determine that the third party application is accessing an electronic device;
    identify the third party application in response to determining that the third party application is accessing the electronic device;
    in response to the identifying, vary a sound characteristic based on the third party application identified, wherein the sound characteristic is obtained by an input device configured to receive sound; and
    prevent a biometric algorithm of the third party application from obtaining user information by providing the varied sound characteristic to the biometric algorithm.

11. The method of claim 10, the one or more processors further including program instructions to:
    obtain a determined filtering sound based on identifying the third party application; obtain the sound characteristic from a microphone of the electronic device; and generating the determined filtering sound adjacent the microphone to vary the sound characteristic.

12. The method of claim 11, wherein to determine filtering sound is based on the biometric algorithm of the third party application.

13. The method of claim 10, the one or more processors further including program instructions to: vary the sound characteristic by changing the sound characteristic after the input device receives the sound characteristic.

14. The method of claim 10, the one or more processors further including program instructions to:
    determine a launching of the third party application on the electronic device; and identify the third party application in response to the launching of the third party application.

15. A sound generating device, comprising:
    a speaker configured to be coupled to an electronic device;
    a processor, and a memory storing program instructions accessible by the processor, wherein, responsive to execution of the program instructions, the processor configured to:
    identify a third party application accessing the electronic device;
    in response to the identifying, vary sound characteristic before the sound characteristic is obtained by an input device of the electronic device based on the third party application identified; and
    prevent a biometric algorithm of the third party application from obtaining user information by providing the varied sound characteristic to the biometric algorithm.

16. The sound generating device of claim 15, further comprising an attachment mechanism configured to secure the sound generating device adjacent the input device of the electronic device.

17. The sound generating device of claim 15, the processor is further configured to: obtain a determined filtering noise based on identifying the third party application; and generate the determined filtering noise to vary the sound characteristic before the sound characteristic is obtained by the input device.

18. The sound generating device of claim 15, wherein the processor is further configured to determine a launching of the third party application on the electronic device; and identify the third party application in response to the launching of the third party application.

* * * * *